350-316. SR 11-09-71 XR 3,619,041

United States Patent

[11] 3,619,041

[72] Inventor David E. Willoughby
Leominster, Mass.

[21] Appl. No. 790,656
[22] Filed Jan. 13, 1969
[45] Patented Nov. 9, 1971
[73] Assignee Technical Operations, Incorporated
Burlington, Mass.

[54] SPECTRAL ZONAL ENCODER EMPLOYING A SILVER HALIDE EMULSION LAYER
2 Claims, 11 Drawing Figs.

[52] U.S. Cl. .......... 350/311, 96/36.4, 350/316, 350/317
[51] Int. Cl. .......... G02b 5/22
[50] Field of Search .......... 350/311, 314, 316, 317; 96/36.4

[56] References Cited

UNITED STATES PATENTS

| | | | |
|---|---|---|---|
| 2,543,477 | 2/1951 | Sziklai et al. | 350/317 X |
| 2,942,972 | 6/1960 | Charlton | 96/36.4 |
| 3,085,878 | 4/1963 | Archer | 350/316 X |
| 3,499,150 | 3/1970 | Tajima et al. | 350/316 X |

*Primary Examiner*—David Schonberg
*Assistant Examiner*—Toby H. Kusmer
*Attorneys*—Rosen & Steinhilper and John H. Coult

ABSTRACT: This disclosure concerns spectral zonal encoders for impressing image information carried by electromagnetic radiation in one or more predetermined spectral zones on spatial carriers, and fabrication methods therefor. One illustrated multizone encoder is a lamination of three grating filters comprising three photoresist grating patterns filled with dye-vehicle filter materials having preferential absorption in different regions of the visible spectrum. Another illustrated encoder comprises a grating filter fabricated by color-coupling lines in an exposed photographic emulsion which is sandwiched between two filled photoresist-grating filters.

PATENTED NOV 9 1971 3,619,041

*DAVID E. WILLOUGHBY*
INVENTOR

BY: *ROSEN and STEINHILPER*
and
*JOHN H. COULT*
ATTORNEYS

SPECTRAL ZONAL ENCODER EMPLOYING A SILVER HALIDE EMULSION LAYER

CROSS-REFERENCE TO RELATED APPLICATION

This application discloses subject matter described and claimed in copending application, Ser. No. 785,311 filed Dec. 19, 1968.

BACKGROUND OF THE INVENTION

It is known that image information carried by radiation in a predetermined spectral zone may be impressed upon a spatial carrier (for recording color information on black and white film, for example) by intercepting the radiation with a grating filter comprising interlaced periodic arrays of elements respectively transmissive and absorptive to radiation in the spectral zone of interest. Using this principle, full color information in a scene may be encoded on black and white or other colorless film by multiplying an image of the scene with an encoder comprising three subtractive filter grids (magenta, cyan, and yellow).

The success of attempts to thus encode color information on a colorless storage media is to a large measure dependent upon the quality of the encoder employed. The optimal encoder has the following qualities:

1. It should offer the capability of wide dye selectibility in order that dyes having desired spectral characteristics and other optical properties may be used;
2. It should offer the capability of dye concentration control;
3. It should have low overall neutral density; and
4. It should offer the capability of holding high line frequencies with good line definition and freedom from dye bleeding.

Further, the ideal encoder should be capable of being fabricated "to order" as a composite laminate of preprepared component grating filters with the desired spectral characteristics.

PRIOR ART

U.S. Pat. Nos. 3,328,634 and 3,314,052 each disclose a spectral zonal encoder; however, the disclosures are only schematic, no encoder structures or fabrication methods being depicted. I am not aware of any prior art specifically describing a spectral zonal encoder structure or fabrication method therefor. The only prior art known of even remote interest is U.S. Pat. No. 2,942,972-Charlton which is concerned not with spectral zonal encoders as described and claimed herein, but with photographic stencil negatives or positives for line printing objects with decorative patterns disposed on a flexible base capable of being deformed around an object to be printed and these being rigidified to the deformed shape for repeated stencil applications. A comparison of the teachings of Charlton with those of applicant's will evidence the inapplicability of Charlton's patent as an anticipation of the present invention.

OBJECTS OF THE INVENTION

It is an object of this invention to provide an improved spectral zonal encoder capable of fulfilling each of the above-noted characteristics of an optimal encoder. Thus, it is an object to provide a spectral zonal encoder which allows for very great selectibility of dyes and dye vehicles, which offers freedom in controlling dye concentrations, which has a low overall neutral density, and which offers the capability of fabrication from preexisting component grating filters.

It is another object to provide a spectral zonal encoder capable of being fabricated with high grating line frequencies and with sharp definition of the individual grating lines.

It is still another object of the invention to provide novel encoder fabrication methods which minimize bleeding of the filter dyes into the areas of neutral density, and which result in encoders protected from chemical and physical degradation during use.

Other objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein.

BACKGROUND OF THE INVENTION

Figure 1:
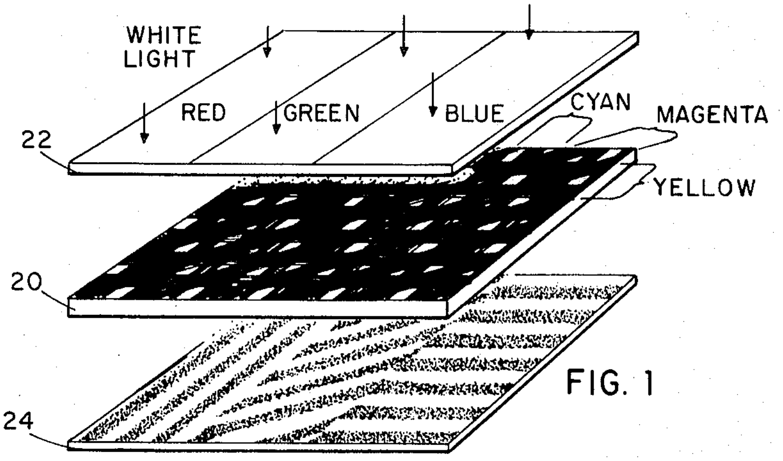
FIG. 1 depicts schematically the manner in which a spectral zonal encoder having three subtractive grating filters oriented at different azimuthal orientations is effective to encode color image information on a colorless photostorage medium.

FIG. 1 illustrates a spectral zonal encoder 20 acting to impress imagewise color information on spatial carriers. The encoded information is shown as being recorded on a black and white photosensitive storage medium 24. The color information is introduced in the form of a color transparency 22 having red, green, and blue areas illuminated with white light. The spectral zonal encoder 20 comprises a first periodic grating filter having alternate cyan and neutral density filter strips, a second periodic grating filter having alternate yellow and neutral density strips oriented at 90° with respect to the cyan filter and a third periodic grating filter having alternate magenta and neutral density strips oriented at 45° to the cyan and yellow filters.

Fabrication of spectral zonal encoders according to the teachings of the invention involves producing a laminae structure including one or more layers of a photoresist-grating pattern filled with a material having a predetermined spectral absorption characteristic. In a multifilter structure each of the grating filters has a different spectral absorption characteristic.

Before describing the present invention, in order that it may be most thoroughly understood and appreciated and in order to frame the present invention in its proper relationship to other related inventions, a spectral zonal encoder constituting the invention of Steven L. Brown, described and claimed in a copending application (identified above) will be first discussed.

Figure 2:
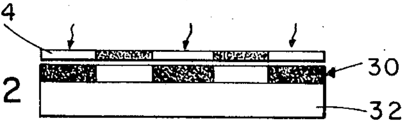
FIGS. 2–7 illustrate as background material the sequence of steps taken to fabricate a spectral zonal encoder according to the invention claimed in the above-identified copending application, FIG. 7 showing that encoder in its final form.

FIGS. 2–7 illustrate the referent Brown spectral zonal encoder and fabrication methods therefor. Referring to FIG. 2, to produce a first grating filter a layer 30 of photoresist material, such as Kodak Ortho Resist (KOR) or Kodak Photoresist No. 4 (KPR-4) is deposited in a uniform layer (e.g., by spinning techniques) upon a base 32 which is preferably flat to within a few microns. Photographic grade glass plates have been found to be satisfactory in all respects as a base material. The photoresist material is preferably filtered to prevent undissolved particles in the resist solution from causing imperfection in the layer. It has been found that photoresist layers in the range of 3–5 microns gives good results although this range is not critical and may be extended from both extremes.

Figure 3:
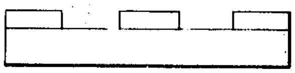
Figure 4:
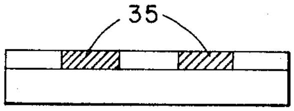

A master grid 34 containing a high quality pattern of alternative opaque and transparent areas and having the desired spatial frequency and line-to-space width ratio is placed in contact with the photoresist-coated plate and exposed, for example, to a 100 W. mercury arc lamp. The exposed photoresist layer 30 is then processed by conventional tray, spray, or vapor condensation methods. Spray processing with filtering between each process cycle has proven to be the most satisfactory processing method. The exposure and processing steps result in a hardening of the exposed areas and a dissolution of the unexposed areas to form a raised grating pattern comprising spaced parallel strips of photoresist material as shown in FIG. 3.

To harden the unfilled photoresist grating pattern, the structure may be baked, e.g., at a temperature of 150° C. for 15 minutes. The pattern is then filled with a filter material 35. If the encoder is to be effective in the visible spectrum, the filter material will preferably comprise a dye carried in a suitable vehicle, as described in more detail below. The dye-vehicle material 35 is deposited on the pattern after filtering (e.g., with a 5 or 10 micron Millipore filter.) The pattern is spun to uniformly fill all the grooves in the pattern. The pattern is preferably spun-dry after which excess dye extending above the photoresist pattern is removed by burnishing the surface of the plate with a soft cloth (see FIG. 4).

After the burnishing operation, the plate is baked, for example at a temperature of 150° C. for 60 minutes, to harden the dye-vehicle material filling the photoresist pattern to preclude the filter material from being lifted from the pattern grooves during subsequent operations.

As intimated above, a multigrid spectral zonal encoder may be fabricated by forming in succession a plurality of photoresist grating patterns filled with dye materials having different spectral absorption characteristics. It has been found, however, that if a second layer of photoresist material is applied directly upon layer 30, during the processing of the photoresist material the solutions employed will vary often lift and degrade the underlying filter pattern formed previously. To overcome this problem, a transparent barrier layer 36 is applied over the single color grating filter thus formed. A number of materials have been found to be satisfactory to form such a barrier layer—Kodak photoresist material (KOR) has been found to be completely satisfactory and accomplishes the desired functions.

Figure 5:
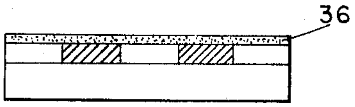
Figure 6:
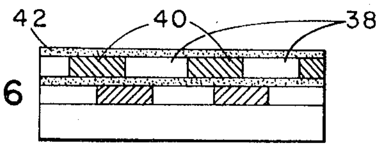

A photoresist barrier layer 36 may be formed by spinning the laminate and applying a measured amount of KOR in a continuous stream on the plate. A uniform coating is thus produced, the thickness of the coating being a function of the viscosity of the material, the speed of the spinner, and the quantity of the material applied, as is well-known. The thickness of the barrier layer 36 may be in the order of 2–3 microns, for example. To insure that dust does not come into contact with the plate, the spinner is preferably shielded. The barrier layer 36 is subsequently uniformly exposed, processed, and baked. The laminate would then appear as shown in FIG. 5.

A barrier layer of photoresist material, as described, is completely satisfactory in accomplishing its intended function, however, the requirement for multiple baking operations for each grating filter causes long fabrication times. As an alternative to baked photoresist as a barrier layer, it has been found that certain epoxy lacquers may be used with very satisfactory results. Such a lacquer material is manufactured by Guardsman Chemical Coating, Inc. of Grand Rapids, Michigan under the designation of Chemgaro, for use in floor waxes. The material has a curing additive and sets upon drying to form an optically clear layer which is hard and impervious to photoresist solutions and other solvents and swelling agents which will contact it during the fabrication of succeeding grating filter layers.

As yet another alternative for the barrier film, a vinyl-lacquer composite layer may be used. A clear vinyl resin film may be deposited directly upon the filled photoresist pattern, followed by a lacquer film. The vinyl will not degrade the photoresist pattern or the filter material filling the pattern and prevents the lacquer film from bleeding the dyes. The lacquer film in turn acts as a barrier to the solvents applied in subsequent operations. The use of epoxy lacquers or vinyl-lacquer composite films as a barrier layer has been found to obviate the need for all of the above-described baking operations.

Although a single color grating filter as thus formed may be useful in certain applications, a set of three superimposed grating filters of different azimuthal orientation and spectral absorption properties may be desired. A second grating filter may be formed upon the surface of the barrier layer 36 by generally following the above-described operations, namely depositing a second layer of photoresist material, exposing the photoresist through the master grating 34 (which may be set at a different angular orientation than during the exposure of the first photoresist layer, as described above,) and processing the photoresist layer to form a second unfilled photoresist line pattern 38. It has been found that, unexplainably, succeeding photoresist layers require less exposures. After baking the pattern 38, the pattern is filled with a second filter material 40 having a spectral absorption peak in a different region of the visible spectrum from that of the first filter material 35. By way of example, the first-formed grating filter may be magenta-neutral and the second may be yellow-neutral. After baking, as described above, a second barrier layer 42 is deposited and processed.

Figure 7:
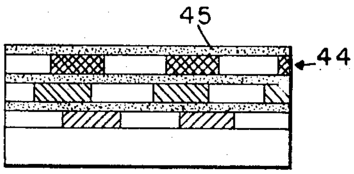
Figure 8:
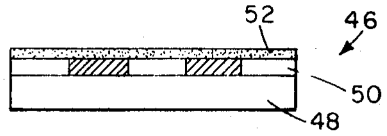
FIGS. 8–11 illustrate a sequence of steps which may be taken to fabricate a spectral zonal encoder according to this invention, FIG. 11 illustrating the encoder in its final state of fabrication.

Finally, a third grating filter 44, for example cyan-neutral at a third angular orientation distinct from the orientations of first and second grating filters, may be fabricated following the steps set forth above. The final composite filter appears as shown in FIG. 7. The relative layer thicknesses in all figures of the drawing are not drawn to scale, but are distorted to clarify the explanation of the principles of the invention.

The final layer 45 in the FIG. 7 encoder has been implicitly described as being a layer of photoresist material as used to form the first and second barrier layers 36 and 42. The general requirements for this final layer are that it must be easily applied, transparent, moisture resistant, and hard enough to resist scratching. A thin (e.g., 1–3 mils) glass slip has proven to be very satisfactory. Rather than using a resist material or glass, a layer of polyvinyl alcohol, epoxy resin, nitrocellulose, evaporated silicon monoxide, evaporated quartz, Mylaweld, Mylar tape or other materials may be employed.

This method of grating preparation is expedient in the respect that the dye density of a given set of lines can be checked on a microspectoradiometer just after the burnishing step. If the density is found to be incorrect, the dye-vehicle material can be washed from the grooves and a different concentration applied.

In addition to the advantage of being able to test each grating filter after fabrication and before deposition of a succeeding layer, the methods and techniques of the referent Brown invention offer many distinct advantages and flexibilities not found in other methods of grating filter manufacture. As opposed to color coupling techniques, for example, that invention offers the capability of being able to select dyes and vehicles from thousands of available materials in order to obtain combinations with the desired properties. Dye concentrations are easily controlled to give the desired degree of absorption of incident radiation. The neutral density of encoders formed as described is exceptionally low, resulting in minimum light attenuation and optimum effective recording speeds. A further distinct advantage over certain prior art methods is provided by the superior line definition which is capable of being produced using the described photoresist techniques.

Although a great many dyes and dye-vehicle combinations may be employed, certain combinations have been found to be optimal for encoding full color information in the visible spectrum in terms of capability of uniform application, receptivity to burnishing, adhesion to the resist, solubility characteristics, and certain other desired properties. An alcohol soluble vehicle, PVP/VA E/635 obtainable from the General Aniline and Film Corporation has been found to be exceptionally suited to this application. It may be used in connection with alcohol soluble dyes or may be diluted with water and used primarily with water-soluble dyes. This vehicle has excellent burnishing characteristics and is highly compatible with succeeding resist layers.

A wide selection of commercial dyestuffs is available; however, again certain dyes have been found to exceed others in terms of thermal stability and spectral characteristics. The following magenta, cyan, and yellow dyes are known to produce very satisfactory results:

Magenta-Sulphorhodamine B Extra (General Aniline and Film Corporation No. RN-05172);

Cyan-Alphazurine 2G (Sagamore No. 1236);

Yellow-Metanil Yellow Extra Conc. (General Aniline and Film Corporation).

The dye materials used are preferably purified to the highest degree possible in order to increase the spectral absorption capabilities of the dye for a given concentration.

The combined dye vehicle solutions may have the following constitution:

Metanil Yellow
10 g. in 125 l. 95% ethanol, 90 ml. water and 5 g. PVP/VA (635) Batch 1968

Alphazurine 2G
2g. in 200 ml. 95% ethanol, 10 g. PVP/VA (635)

Sulpho-Rhodamine B
5 g. in 125 ml. 95% ethanol, 25 ml. water, 10 drops glycerin, 10 g. PVP/VA (635)

Although the absolute and relative thicknesses of the component layers constituting the above-described laminate filter are not extremely critical, good results have been obtained with filters in which the filled photoresist layers are approximately 3 microns thick and in which the barrier layers are approximately 2 microns in thickness.

DESCRIPTION OF THE PREFERRED EMBODIMENTS

The encoder structures described above are completely operative and entirely satisfactory for the intended purpose. In the fabrication process, however, the encoders necessarily are formed by successive depositions to build up a composite laminate structure. If it is found that a layer is faulty, the entire assembly which has been produced to that point must be discarded. It is an object of this invention to provide an improved encoder and fabrication methods therefor which do not suffer from this production drawback. FIGS. 8–11 illustrate the present inventive concepts implements in an embodiment fabricated from grating filters which are separately preprepared and which are assemblied into a composite laminate structure in a final step. This invention has the advantage of allowing for rejection of a single component grating filter without affecting any other grating filter and further providing much greater flexibility in the assembling of multiple filter encoders to order from an inventory of individual grating filters having varied spectral characteristics.

Figure 9:
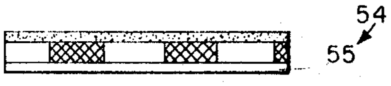
Figure 10:
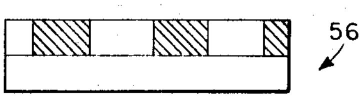
Figure 11:
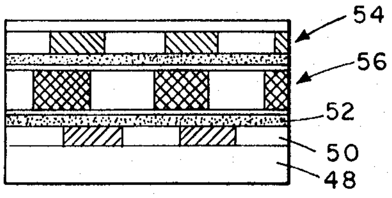

According to this invention, a first grating filter 46 (see FIG. 8) comprises a base 48, a filled photoresist pattern 50, and a transparent protective layer 52, fabricated as described above with respect to FIGS. 2–5. A second grating filter 54, shown in FIG. 9, is fabricated separately and employs a different filter material than filter 46 shown in FIG. 8. The filter 54 is fabricated substantially the same as filter 46 except that the photoresist pattern is formed upon a very thin (2 mils or less, for example) wafer 55 of a glass or similar material which will eventually serve as a protective layer for the ultimate encoder structure. Because of the extreme fragility of the wafer 55, the wafer is preferably adhered to a flat-surfaced anvil with a drop of water or other fluid before deposition of the photoresist material. The surface tension of the fluid creates sufficient bonding strength to secure the wafer during deposition and processing of the photoresist layers, but insufficient bonding to cause the wafer to fracture upon separation of the wafer from the anvil.

A third component-grating filter 56 (see FIG. 10) is preferably formed on a stripping layer, e.g., by color coupling a silver halide stripping emulsion. This grating filter 56 is preferably the yellow filter (in a three subtractive filter encoder for use in encoding color values in the visible spectrum, as described) and may be fabricated as follows.

First, through a master grating such as shown in FIG. 2 at 34, expose a suitable high-resolution stripping film for 45 seconds at 30 inches from a 100-watt tungsten lamp, contact being provided by a pressure jig. The emulsion is then developed, bleached, and reexposed, followed by color development, for example with Kodachrome K-11 yellow. The emulsion, after conventional processing, will produce a color-coupled yellow-grating filter.

To assemble the three component grating filters into a single composite encoder structure, the stripping layer is first bonded to the component filter 46 using an epoxy cement, after which the stripping layer on the emulsion is removed. Finally, the component filter 54 is bonded in an inverted position to the color-coupled grating filter 56 with epoxy cement. After the cement has set, the anvil is slid away from the filter 54. A composite laminate structure protected by the thin glass wafer 55 is thus formed. The barrier layers formed as a part of the component grating filters 46 and 54 prevent degradation of the grating filters, particularly bleeding of the dyes, caused by the epoxy solvents.

Examples of cements and cementing conditions which have proven satisfactory are as follows:

| | |
|---|---|
| Epo-Tek 201 | Ambient temp.—18 hrs. |
| Ethylene glycol dimethacrylate and α,α′-azobisisobutyronitrile | 100° C.—10 min. |
| Ethyl β-cyanoacrylate and α,α′-azobisisobutyronitrile | 100° C.—20 min. |

With certain of the above cements the protective barrier layer may be omitted without causing bleeding of the dyes and without degradation of the bond between the composite grating filters.

The invention is not limited to the particular details of construction of the embodiments depicted, and it is contemplated that various and other modifications and applications will occur to those skilled in the art. For example, the grating filter formed on the stripping layer, rather than being formed by color coupling a stripping emulsion, might comprise a grating filter formed from strippable Color Key material manufactured by the Printing Products Division—Minnesota Mining and Manufacture Co., St. Paul, Minn. Certain changes may be made in the above-described process without departing from the true spirit and scope of the invention herein involved, and it is intended that the subject matter of the above depiction shall be interpreted as illustrative and not in a limiting sense.

What is claimed is:

1. A laminate spectral zonal encoder for impressing information carried by radiation in different spectral zones on spatial carriers, comprising, in stacked relationship:
- a base;
- a first photoresist layer arranged on said base in a spatially periodic pattern and a first filter material in the interstices of said pattern having a preferential absorption for radiation in a first spectral zone;
- a continuous second layer with a spatially periodic pattern of filter areas having a preferential absorption for radiation in a second spectral zone, said second layer comprising a stripping layer of a color-developed silver halide stripping emulsion;
- a second photoresist layer bonded to said second layer and comprising a spatially periodic pattern and a filter material in the interstices of said second photoresist pattern having a preferential absorption for radiation in a third spectral zone; and
- a transparent protective layer on said second photoresist layer.

2. A spectral zonal encoder for impressing information carried by radiation in different spectral zones on separately detectable spatial carriers, comprising:
- a base having a receiving surface;
- a first photoresist layer arranged on said base in a spatially periodic pattern having a first vectorial direction;

a first filter material in the interstices of said first photoresist material having a preferential absorption for radiation in a first spectral zone;

a transparent barrier layer on said first photoresist layer;

a processed photographic silver halide emulsion layer on said barrier layer having a spatially periodic pattern having a second vectorial direction, said pattern containing color-coupled dyes having a preferential absorption for radiation in a second spectral zone;

a second transparent barrier layer on said emulsion layer;

a second photoresist layer bonded to said second barrier layer and comprising a spatially periodic pattern having a third vectorial direction distinct from said first and second vectorial directions of said first and second periodic patterns;

a filter material in the interstices of said second photoresist pattern having a preferential absorption for radiation in a third spectral zone; and a transparent protective layer on said second photoresist layer.

* * * * *